(12) United States Patent
Li et al.

(10) Patent No.: US 9,560,623 B2
(45) Date of Patent: Jan. 31, 2017

(54) MOBILE TERMINAL, AND LOCATING METHOD AND DEVICE

(71) Applicant: ZTE Corporation, Shenzhen (CN)

(72) Inventors: Chao Li, Shenzhen (CN); Wen Leng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/774,876

(22) PCT Filed: Jul. 19, 2013

(86) PCT No.: PCT/CN2013/079729
§ 371 (c)(1),
(2) Date: Sep. 11, 2015

(87) PCT Pub. No.: WO2013/174314
PCT Pub. Date: Nov. 28, 2013

(65) Prior Publication Data
US 2016/0044626 A1   Feb. 11, 2016

(30) Foreign Application Priority Data
Mar. 14, 2013   (CN) .......................... 2013 1 0081803

(51) Int. Cl.
*H04W 64/00*   (2009.01)
*G01S 3/04*   (2006.01)
(Continued)

(52) U.S. Cl.
CPC ................ *H04W 64/00* (2013.01); *G01S 3/04* (2013.01); *G01S 3/14* (2013.01); *G01S 5/0226* (2013.01); *G01S 5/06* (2013.01); *H04W 84/12* (2013.01)

(58) Field of Classification Search
CPC ..... H04B 7/024; H04B 7/0608; H04B 7/0814; H04B 7/0408; H04W 64/00; H04W 84/12; G01S 3/14; G01S 5/0226; G01S 5/06; H01Q 3/24
(Continued)

(56) References Cited

U.S. PATENT DOCUMENTS

| 2004/0111184 A1 | 6/2004 | Chiappetta |
| 2007/0077941 A1* | 4/2007 | Gonia ........................ G01S 1/66 455/456.1 |

(Continued)

FOREIGN PATENT DOCUMENTS

| CN | 1710987 A | 12/2005 |
| CN | 101848045 A | 9/2010 |

(Continued)

OTHER PUBLICATIONS

International Search Report for corresponding application PCT/CN2013/079729 filed Jul. 19, 2013; Mail date Dec. 26, 2013.
(Continued)

*Primary Examiner* — Phuoc H Doan
(74) *Attorney, Agent, or Firm* — Cantor Colburn LLP

(57) ABSTRACT

A mobile terminal, and a locating method and device are provided, wherein the mobile terminal includes a first antenna, configured to transmit a first signal to an anchor node, wherein the first signal is used by the anchor node to detect the signal strength of the first antenna; a second antenna, arranged with the first antenna according to a preset angle and configured to transmit a second signal to the anchor node, wherein the second signal is used by the anchor node to detect the signal strength of the second antenna. The preset angle enables the coverage of the first antenna and the second antenna to be overlapped to some extent. The signal strength of the first antenna and the signal strength of the second antenna are used for determining a location of the mobile terminal.

20 Claims, 6 Drawing Sheets

(51) Int. Cl.
*G01S 3/14* (2006.01)
*G01S 5/02* (2010.01)
*G01S 5/06* (2006.01)
*H04W 84/12* (2009.01)

(58) Field of Classification Search
USPC .......... 455/456.1, 446; 370/252, 328, 342;
340/572.1; 342/394, 442
See application file for complete search history.

(56) References Cited

U.S. PATENT DOCUMENTS

| | | |
|---|---|---|
| 2007/0197229 A1 | 8/2007 | Kalliola |
| 2013/0009821 A1 | 1/2013 | Steer et al. |
| 2013/0142054 A1* | 6/2013 | Ahmadi ................ H04B 7/024 370/252 |
| 2013/0154836 A1* | 6/2013 | Derrico ................ G01S 5/0273 340/572.1 |

FOREIGN PATENT DOCUMENTS

| | | |
|---|---|---|
| CN | 102102470 A | 6/2011 |
| CN | 102685883 A | 9/2012 |
| GB | 2047038 A | 11/1980 |
| WO | 2012042851 A1 | 4/2012 |
| WO | 2012066563 A2 | 5/2012 |

OTHER PUBLICATIONS

Supplementary European Search Report for corresponding application EP13794572 filed Jul. 19, 2013; Mail date Feb. 17, 2016.

* cited by examiner

MOBILE TERMINAL, AND LOCATING METHOD AND DEVICE

TECHNICAL FIELD

The present invention relates to the field of communications, and particularly to a mobile terminal, a method and device for determining an angle between a mobile terminal and an anchor node, and a locating method and device.

BACKGROUND

With advantages including low cost, high precision and wide application (indoors and outdoors) and so on, a locating system based on a Wireless Local Area Network (WLAN) has achieved great success in location-based services, such as aspects including emergency rescue, intelligent transportation and indoor positioning and navigation and so on. However, two problems as follows still need to be solved. The first problem is that the locating precision of the WLAN is seriously deteriorated by fluctuation of a Received Signal Strength (RSS) caused by factors including multi-path interference and so on, and the second problem is that the WLAN can be hardly located due to the lack of an Access Point (AP) in an area not covered by the AP.

Many methods have been proposed to solve the problems, which can be divided into the following two types.

The first type is a WLAN locating system based on a time diversity and a probability distribution model. The basic idea of the WLAN locating system based on a time diversity and a probability distribution model is that a plurality of samples of RSSs is acquired by using a time diversity at a fixed location in a locating area, a probability distribution model of the RSSs is established according to information of the plurality of samples and stored in a characteristic database; in a locating phase, a mobile target acquires the plurality of samples of the RSSs by using the time diversity, and calculates an average value of the samples to acquire a stable RSS so as to perform locating. Since a large amount of time is consumed by the time diversity, a locating delay is increased, thereby real-time locating can be hardly implemented, the WLAN locating system based on a time diversity and a probability distribution model cannot be used in mobile locating, and the database will fail after an environment changes.

The second type is a WLAN locating system based on Kalman filtering. The basic idea of the WLAN locating system based on Kalman filtering is that location estimation of a mobile target is acquired by using a WLAN locating algorithm first, then a state equation and an observation equation of a Kalman filter is constructed by using the track continuity of the mobile target or by assuming that a velocity of the mobile target is in a certain range, thereby filtering location estimation of a user. Although such a method improves the locating precision of the WLAN locating system, adaptive filtering can be hardly implemented due to the fact that the velocity of the mobile target has been set in advance, thereby limiting practical application, and the problem that WLAN locating fails caused by the lack of an AP cannot be solved.

SUMMARY

The present invention provides a mobile terminal, a method and device for determining an angle between a mobile terminal and an anchor node, and a locating method and device, so as to at least solve problems in the related art that real-time locating cannot be achieved, a locating process is complex and an environment is limited in a locating process of a WLAN.

A mobile terminal is provided according to an aspect of the present invention, including: a first antenna, configured to transmit a first signal to an anchor node, wherein the first signal is used by the anchor node to detect the signal strength of the first antenna; a second antenna, arranged with the first antenna according to a preset angle and configured to transmit a second signal to the anchor node, wherein the second signal is used by the anchor node to detect the signal strength of the second antenna, there is an overlap between the coverage of the first antenna and that of the second antenna due to the preset angle, and the signal strength of the first antenna and the signal strength of the second antenna are used for determining a location of the mobile terminal.

Preferably, the mobile terminal further includes: a radio frequency switch, connected with the first antenna and the second antenna, and configured to control the first antenna and the second antenna not in an open state or a closed state simultaneously.

A method for determining an angle between a mobile terminal and an anchor node is provided according to another aspect of the present invention, including that the strength of a first signal transmitted by a first antenna of the mobile terminal is determined; the strength of a second signal transmitted by a second antenna of the mobile terminal is determined, wherein the second antenna is arranged with the first antenna according to a preset angle, and there is an overlap between the coverage of the first antenna and that of the second antenna due to the preset angle; a relative angle between the mobile terminal and the anchor node is determined according to a linear relation of a ratio of the strength of the first signal to the strength of the second signal.

Preferably, a calculation formula for determining the relative angle $\varphi$ between the mobile terminal and the anchor node according to the linear relation of the ratio of the strength of the first signal to the strength of the second signal is as follows:

$$\varphi = \frac{RSSI_A}{RSSI_B} k,$$

where $RSSI_A$ is the strength of the first signal received from the first antenna, $RSSI_B$ is the strength of the second signal received from the second antenna, and k is a natural number.

A locating method is provided according to still another aspect of the present invention, including that a plurality of relative angles between a mobile terminal and a plurality of anchor nodes are determined according to the strength of a first signal received by the plurality of anchor nodes and transmitted by a first antenna of the mobile terminal, and the strength of a second signal transmitted by a second antenna of the mobile terminal, wherein the second antenna and the first antenna are arranged according to a preset angle, and there is an overlap between the coverage of the first antenna and that of the second antenna caused by the preset angle; a location of the mobile terminal is determined according to the plurality of relative angles with the plurality of anchor nodes.

Preferably, When there are two anchor nodes, the method includes that a plurality of relative angles between the mobile terminal and the two anchor nodes are determined according to the strength of the first signal transmitted by the first antenna and the strength of the second signal transmitted by the second antenna; the location of the mobile terminal is determined according to the plurality of relative angles with the two anchor nodes.

Preferably, the operation that the plurality of relative angles between the mobile terminal and the two anchor nodes are determined according to the strength of the first signal transmitted by the first antenna and the strength of the second signal transmitted by the second antenna includes that a first group of relative angles between the mobile terminal and the two anchor nodes are determined according to the strength of the first signal transmitted by the first antenna and the strength of the second signal transmitted by the second antenna, wherein the relative angles include: a first relative angle between the mobile terminal and a first anchor node, and a second relative angle between the mobile terminal and a second anchor node; a second group of relative angles, a third group of relative angles and a fourth group of relative angles are determined according to the signal strength of an antenna group consisting of the first antenna and the second antenna after each rotation of the mobile terminal, wherein the mobile terminal is rotated for three times, and is rotated by 90 degrees each time.

Preferably, the operation that the first group of relative angles between the mobile terminal and the two anchor nodes are determined according to the strength of the first signal transmitted by the first antenna and the strength of the second signal transmitted by the second antenna includes that a first group of first relative angles between the first anchor node and the mobile terminal are determined according to the strength of the first signal transmitted by the first antenna and the strength of the second signal transmitted by the second antenna; a first group of second relative angles between the second anchor node and the mobile terminal are determined according to the strength of the first signal transmitted by the first antenna and the strength of the second signal transmitted by the second antenna.

Preferably, after the first group of second relative angles between the second anchor node and the mobile terminal are determined according to the strength of the first signal transmitted by the first antenna and the strength of the second signal transmitted by the second antenna, the method further includes that the location of the mobile terminal is determined according to the first relative angles and the second relative angles.

Preferably, the operation that the location of the mobile terminal is determined according to the plurality of relative angels with the two anchor nodes includes that two relative angles with the strongest strength of the first signal or the second signal received by the two anchor nodes are selected respectively; the location of the mobile terminal is determined according to the two relative angles.

Preferably, the relative angles are in a linear relation with ratio of the strength of first signal received from the first antenna to the strength of the second signal received from the second antenna.

Preferably, a calculation formula of the relative angles $\phi$ is as follows:

$$\varphi = \frac{RSSI_A}{RSSI_B} k,$$

where $RSSI_A$ is the strength of the first signal received from the first antenna, $RSSI_B$ is the strength of the second signal received from the second antenna, and k is a natural number.

A locating device is provided according to still another prospect of the present invention, including: a first determining module, configured to determine, according to the strength of a first signal received by a plurality of anchor nodes and transmitted by a first antenna of a mobile terminal, and the strength of a second signal transmitted by a second antenna having coverage overlapped with that of the first antenna of the mobile terminal, a plurality of relative angles between the mobile terminal and the plurality of anchor nodes; a second determining module, configured to determine a location of the mobile terminal according to the plurality of relative angles with the plurality of anchor nodes.

Preferably, the first determining module is further configured to determine, according to the strength of the first signal transmitted by the first antenna and the strength of the second signal transmitted by the second antenna, a plurality of relative angles between the mobile terminal and two anchor nodes; the second determining module is further configured to determine the location of the mobile terminal according to the plurality of relative angles with the two anchor nodes.

Preferably, the first determining module includes: a determining unit, configured to determine, according to the strength of the first signal transmitted by the first antenna and the strength of the second signal transmitted by the second antenna, a first group of relative angles between the mobile terminal and the two anchor nodes, wherein the relative angles include: a first relative angle between the mobile terminal and a first anchor node, and a second relative angle between the mobile terminal and a second anchor node; the determining unit is further configured to determine, according to the signal strength of an antenna group consisting of the first antenna and the second antenna after each rotation of the mobile terminal, a second group of relative angles, a third group of relative angles and a fourth group of relative angles, wherein the mobile terminal is rotated for three times, and is rotated by 90 degrees each time.

Preferably, the determining unit includes: a first determining sub-unit, configured to determine, according to the strength of the first signal transmitted by the first antenna and the strength of the second signal transmitted by the second antenna, a first group of first relative angles between the first anchor node and the mobile terminal; a second determining sub-unit, configured to determine, according to the strength of the first signal transmitted by the first antenna and the strength of the second signal transmitted by the second antenna, a first group of second relative angles between the second anchor node and the mobile terminal.

A device for determining an angle between a mobile device and an anchor node is provided according o still another prospect of the present invention, including: a third determining module, configured to determine the strength of a first signal transmitted by a first antenna of the mobile terminal; a fourth determining module, configured to determine the strength of a second signal transmitted by a second antenna of the mobile terminal, wherein the coverage of the second antenna is overlapped to some extent with that of the first antenna; a fifth determining module, configured to determine, according to a linear relation of a ratio of the strength of the first signal to the strength of the second signal, a relative angle between the mobile terminal and the anchor node.

Preferably, the fifth determining module determines the relative angle $\phi$ according to the following formula:

$$\varphi = \frac{RSSI_A}{RSSI_B} k,$$

where $RSSI_A$ is the strength of the first signal received from the first antenna, $RSSI_B$ is the strength of the second signal received from the second antenna, and k is a natural number.

In the present invention, the mobile terminal has two antennae, and these two antennae are arranged at a preset angle. The preset angle can enable the coverage of the two antennae to be overlapped to some degree. The two antennae are respectively configured to transmit an antenna signal to an anchor node to as to determine a location of the mobile terminal. The present invention is applied to solving problems in the related art that real-time locating cannot be achieved, a locating process is complex and an environment is limited in a locating process of a WLAN, thereby implementing flexible real-time locating through the mobile terminal with the two antennae without environmental restriction and with more accurate locating precision.

BRIEF DESCRIPTION OF THE DRAWINGS

The accompanying drawings illustrated herein are used for providing further understanding to the present invention and constitute a part of the application. The exemplary embodiments of the present invention and illustration thereof are used for explaining the present invention, instead of constituting improper limitation to the present invention. In the accompanying drawings.

DETAILED DESCRIPTION OF THE EMBODIMENTS

The present invention will be expounded hereinafter with reference to the accompanying drawings and in combination with the embodiments. It should be noted that the embodiments in the application and the characteristics in the embodiments may be combined with each other if there is no conflict.

Figure 1:
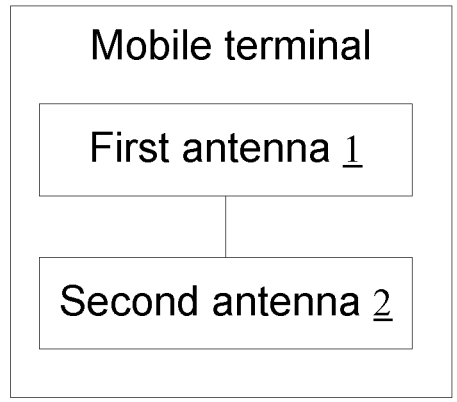
FIG. 1 is a first structural diagram of a mobile terminal according to an embodiment of the present invention.

An embodiment of the present invention provides a mobile terminal based on problems in the related art that real-time locating cannot be achieved, a locating process is complex and an environment is limited in a locating process of a WLAN. FIG. 1 shows a structural diagram of the mobile terminal, including:

a first antenna 1, configured to transmit a first signal to an anchor node, wherein the first signal is used by the anchor node to detect the signal strength of the first antenna 1;

a second antenna 2, arranged with the first antenna 1 according to a preset angle and configured to transmit a second signal to the anchor node, wherein the second signal is used by the anchor node to detect the signal strength of the second antenna 2, the preset angle enables the coverage of the first antenna 1 and the second antenna 2 to be overlapped to some degree, and the signal strength of the first antenna 1 and the signal strength of the second antenna 2 are used for determining a location of the mobile terminal.

The mobile terminal of the embodiment is provided with two antennae arranged according to a preset angle. The preset angle can enable the coverage of the two antennae to be overlapped to some degree. The two antennae are respectively configured to transmit an antenna signal to an anchor node to as to determine the location of the mobile terminal. The mobile terminal of the embodiment is applied to perform locating, thereby solving problems in the related art that real-time locating cannot be achieved, a locating process is complex and an environment is limited in a locating process of a WLAN, so as to further implement flexible real-time locating through the mobile terminal with the two antennae without environmental restriction and with more accurate locating precision.

Figure 2:
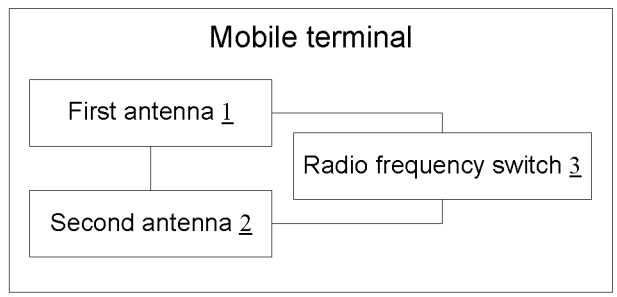
FIG. 2 is a second structural diagram of a mobile terminal according to an embodiment of the present invention.

FIG. 2 shows a preferred structural block diagram of the embodiment. The mobile terminal further includes: a radio frequency switch 3, connected with the first antenna 1 and the second antenna 2, and configured to control the first antenna 1 and the second antenna 2 not in an open state or a closed state simultaneously.

Figure 3:
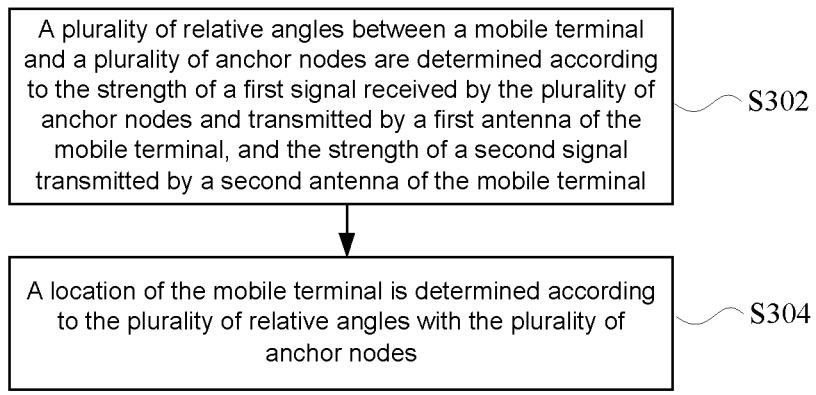
FIG. 3 is a flowchart of a locating method according to an embodiment of the present invention.

An embodiment of the present invention further provides a locating method. The method may be applied in the mobile terminal. FIG. 3 shows a process of the method, including Step 302 to Step 304.

Step 302: A plurality of relative angles between a mobile terminal and a plurality of anchor nodes are determined according to the strength of a first signal received by the plurality of anchor nodes and transmitted by a first antenna of the mobile terminal, and the strength of a second signal transmitted by a second antenna of the mobile terminal, wherein the second antenna and the first antenna are arranged at a preset angle, and the preset angle enables the coverage of the first antenna and the second antenna to be overlapped to some degree.

Step 304: A location of the mobile terminal is determined according to the plurality of relative angles with the plurality of anchor nodes.

The method simplifies a WLAN locating method, and is able to complete locating by only modifying an existing terminal slightly, and adding a directional antenna. The method with a small amount of calculation and little modification to an existing system is simple with extremely high precision compared with an existing WLAN locating algorithm.

In an implementation process, a plurality of relative angles between the mobile terminal and two anchor nodes may be determined according to the strength of the first signal transmitted by the first antenna and the strength of the second signal transmitted by the second antenna when there are two anchor nodes, and the location of the mobile terminal is determined subsequently according to the plurality of relative angles with the two anchor nodes.

A specific location of the detected mobile terminal may be calculated according to relative angles between the detected mobile terminal and a plurality of anchor nodes if the bisector (i.e. an equisignal direction line) of a coverage area of the first antenna and a coverage area of the second antenna is in the same quadrant as the anchor nodes. Relative angles may be acquired by rotating an antenna group consisting of the first antenna and the second antenna by 90 degrees if the equisignal direction line and the anchor nodes are not in the same quadrant.

The plurality of relative angles with the two anchor nodes may be determined through the following method. A first group of relative angles between the mobile terminal and the two anchor nodes are determined according to the strength of the first signal transmitted by the first antenna and the strength of the second signal transmitted by the second antenna, the mobile terminal is rotated subsequently for three times, and is rotated by 90 degrees each time, and a second group of relative angles, a third group of relative angles and a fourth group of relative angles are determined according to the signal strength of an antenna group after each rotation of 90 degrees, wherein the relative angles include: a first relative angle between the mobile terminal and a first anchor node, and a second relative angle between the mobile terminal and a second anchor node.

Each group of relative angles is determined according to a similar process, and description will be provided below by taking the first group of relative angles αs an example. During the process of determining the first group of relative angles, a first group of first relative angles between the first anchor node and the mobile terminal may be determined according to the strength of the first signal transmitted by the first antenna and the strength of the second signal transmitted by the second antenna; a first group of second relative angles between the second anchor node and the mobile terminal are determined according to the strength of the first signal transmitted by the first antenna and the strength of the second signal transmitted by the second antenna.

The operation that the location of the mobile terminal is determined according to the plurality of relative angles with the two anchor nodes may include the following process that two relative angles with the strongest strength of the first signal or the second signal received by the two anchor nodes are selected respectively; the location of the mobile terminal is determined according to the two relative angles.

During an implementation process, the relative angles are in a linear relation with ratio of the strength of first signal received from the first antenna to the strength of the second signal received from the second antenna, wherein a calculation formula of the relative angles $\phi$ is as follows:

$$\varphi = \frac{RSSI_A}{RSSI_B} k,$$

where $RSSI_A$ is the strength of the first signal received from the first antenna, $RSSI_B$ is the strength of the second signal received from the second antenna, and k is a natural number. A value of k may be determined according to engineering calculation.

Figure 4:
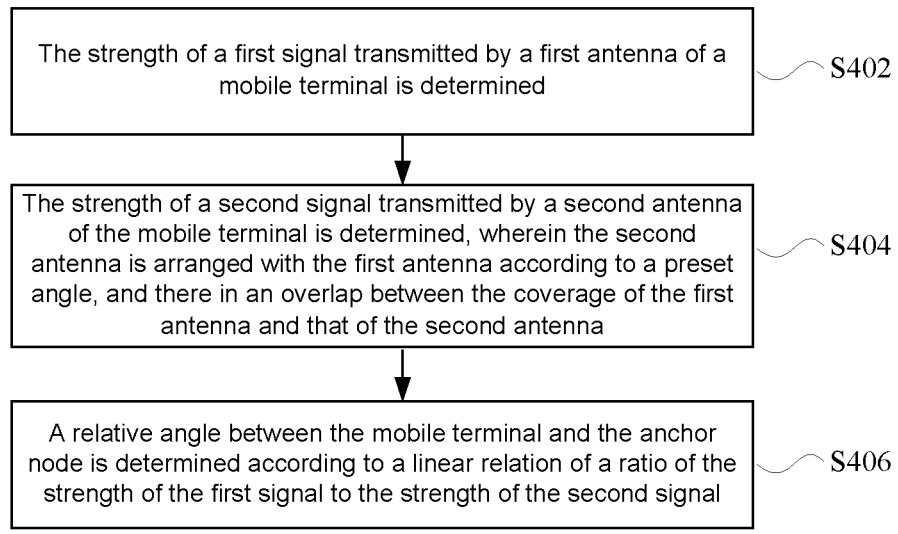
FIG. 4 is a flowchart of a method for determining an angle between a mobile terminal and an anchor node according to an embodiment of the present invention.

The embodiment further provides a method for determining an angle between a mobile terminal and an anchor node. The method may be applied in the locating method according to a process as shown in FIG. 4, including Step 402 to Step 406.

Step 402: The strength of a first signal transmitted by a first antenna of the mobile terminal is determined.

Step 404: The strength of a second signal transmitted by a second antenna of the mobile terminal is determined, wherein the second antenna is arranged with the first antenna according to a preset angle, and the preset angle enables the coverage of the first antenna and the second antenna to be overlapped to some degree.

Step 406: A relative angle between the mobile terminal and the anchor node is determined according to a linear relation of a ratio of the strength of the first signal to the strength of the second signal.

In the method for determining an angle between a mobile terminal and an anchor node, the ratio of the strength of the first signal to the strength of the second signal presents a linear relation, which may be implemented according to the same formula as the calculation formula of the relative angle $\phi$ in the locating method.

Figure 5:
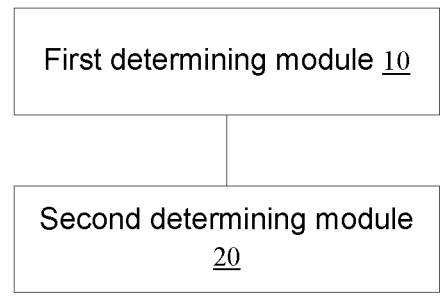
FIG. 5 is a structural block diagram of a locating device according to an embodiment of the present invention.

An embodiment of the present invention further provides a locating device. FIG. 5 shows a structural block diagram of the device, including: a first determining module 10, configured to determine, according to the strength of a first signal received by a plurality of anchor nodes and transmitted by a first antenna of a mobile terminal, and the strength of a second signal transmitted by a second antenna having coverage overlapped to some extent with that of the first antenna of the mobile terminal, a plurality of relative angles between the mobile terminal and the plurality of anchor nodes; a second determining module 20, coupled with the first determining module 10 and configured to determine a location of the mobile terminal according to the plurality of relative angles with the plurality of anchor nodes.

In a preferred embodiment, the first determining module 10 is further configured to determine, according to the strength of the first signal transmitted by the first antenna and the strength of the second signal transmitted by the second antenna, a plurality of relative angles between the mobile terminal and two anchor nodes; the second determining module 20 is further configured to determine the location of the mobile terminal according to the plurality of relative angles with the two anchor nodes.

Figure 6:
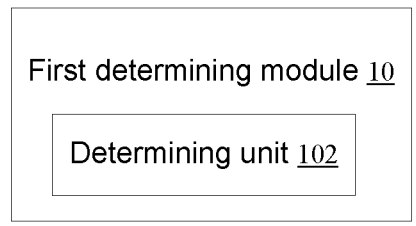
FIG. 6 is a structural block diagram of a first determining module of a locating device according to an embodiment of the present invention.

FIG. 6 shows a structural block diagram of the first determining module 10, including a determining unit 102, configured to determine, according to the strength of the first signal transmitted by the first antenna and the strength of the second signal transmitted by the second antenna, a first group of relative angles between the mobile terminal and the two anchor nodes, wherein the relative angles include: a first relative angle between the mobile terminal and a first anchor node, and a second relative angle between the mobile terminal and a second anchor node; the determining unit 102 is further configured to determine, according to the signal strength of an antenna group after each rotation of the mobile terminal, a second group of relative angles, a third group of relative angles and a fourth group of relative angles, wherein the mobile terminal may be rotated for three times, and is rotated by 90 degrees each time. Of course, the rotation of 90 degrees is a preferred mode of implementation. Rotation by another angle may be also performed as required during the rotation.

Figure 7:
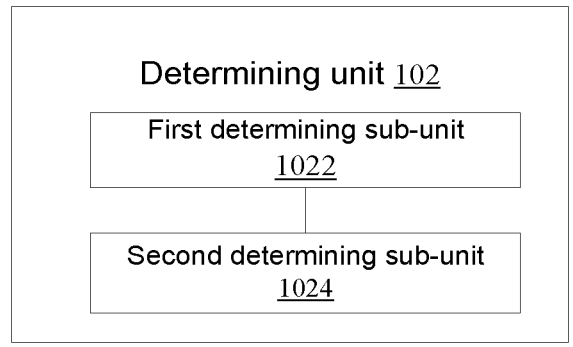
FIG. 7 is a structural block diagram of a determining unit of a locating device according to an embodiment of the present invention.

FIG. 7 shows a structural diagram of the determining unit 102, including: first determining sub-unit 1022, configured to determine, according to the strength of the first signal transmitted by the first antenna and the strength of the second signal transmitted by the second antenna, a first group of first relative angles between the first anchor node and the mobile terminal; a second determining sub-unit 1024, coupled with the first determining sub-unit 1022 and configured to determine, according to the strength of the first signal transmitted by the first antenna and the strength of the second signal transmitted by the second antenna, a first group of second relative angles between the second anchor node and the mobile terminal.

Figure 8:
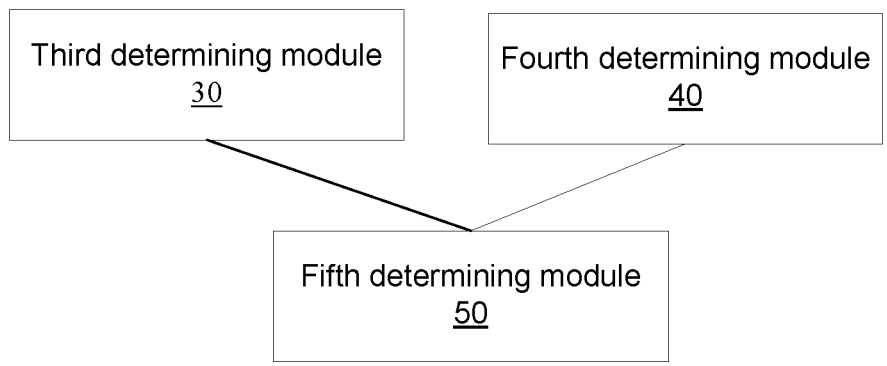
FIG. 8 is a structural block diagram of a device for determining an angle between a mobile device and an anchor node according to an embodiment of the present invention.

The embodiment further provides a device for determining an angle between a mobile device and an anchor node. The device may be arranged independently to implement other functions after determining the angle between the mobile terminal and the anchor node. As a basic device, the device may be also applied inside the locating device to determine a relative angle. Functions implemented by the device are similar as those implemented by the determining unit 102. The device may be as shown in FIG. 8, including:

a third determining module 30, configured to determine the strength of a first signal transmitted by a first antenna of the mobile terminal; a fourth determining module 40, configured to determine the strength of a second signal transmitted by a second antenna of the mobile terminal, wherein the coverage of the second antenna is overlapped to some extent with that of the first antenna; a fifth determining module 50, coupled with the third determining module 30 and the fourth determining module 40 and configured to determine, according to a linear relation of a ratio of the strength of the first signal to the strength of the second signal, a relative angle between the mobile terminal and the anchor node. Of course, FIG. 8 only shows an embodiment, different modules may be coupled with each other as required during design. For example, the third determining module 30 is also coupled with the fourth determining module 40.

Preferred Embodiment

The present invention adjusts an antenna of a Wireless Fidelity (WIFI) terminal into a bi-directional antenna and an AP hotspot of a locating system combines a Received Signal Strength Indication (RSSI) technology with an Angle of Arrival (AOA) technology, thereby solving problems of low precision and bad stability of locating performed according to RSSI in a current design of short distance locating, while not largely increasing the complexity in system design. A design solution of the preferred embodiment will be described below.

Figure 9:
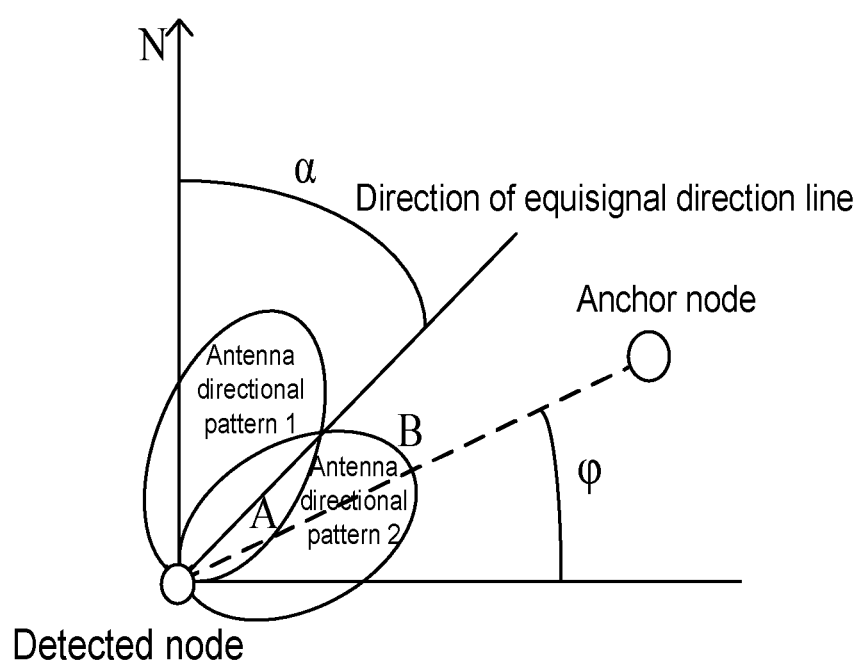
FIG. 9 is a schematic diagram illustrating estimation of an angle of a wireless terminal with two antennae according to a preferred embodiment of the present invention.

A WIFI detected node (i.e. a mobile terminal) including a bi-directional antenna of the embodiment consists of several parts as follows: a bi-directional antenna, a two-to-one radio frequency switch, an accessory for mounting connection, omnidirectional antennae of a plurality of WIFI anchor nodes and a system control terminal connecting the plurality of anchor nodes, and a processor for calculating an angle is further required, wherein the bi-directional antenna consists of two directional antennae with a certain deviation angle when installed, as shown in FIG. 9. The two-to-one radio frequency switch is configured to select an antenna in the bi-directional antenna to transmit a signal from a WIFI device.

As a receiving node, an anchor node (an AP hotspot) in FIG. 9 is configured to receive a signal from a transmission node of the mobile terminal. The anchor node is an omni-directional antenna and the detected node (i.e. the WIFI mobile terminal) includes two directional antennae having two partly-overlapped directions, as shown in FIG. 1, wherein an equisignal line refers to a direction line represented by an intersection of two directional diagrams.

The strengths of signals received by the AP hotspot from the two directional antennae are defined as $RSSI_A$ and $RSSI_B$ respectively. A relative angle between the detected node and the anchor node is:

$$\varphi = \frac{RSSI_A}{RSSI_B} k,$$

where $\varphi$ is the relative angle between the detected node and the anchor node, $RSSI_A$ and $RSSI_B$ are the strengths of the signals received from the two directional antennae, and k represents a constant which may be acquired according to engineering calculation. The relative angle between the detected node and the anchor node presents a certain linear relation with the ratio of $RSSI_A$ to $RSSI_B$ of the strengths of the signals received from the two directional antennae by the anchor node. The relative angle between the detected node and the anchor node may be detected by using this relation, and a specific location of the detected node may be calculated according to relative angles between the detected node and a plurality of anchor nodes.

Figure 10:
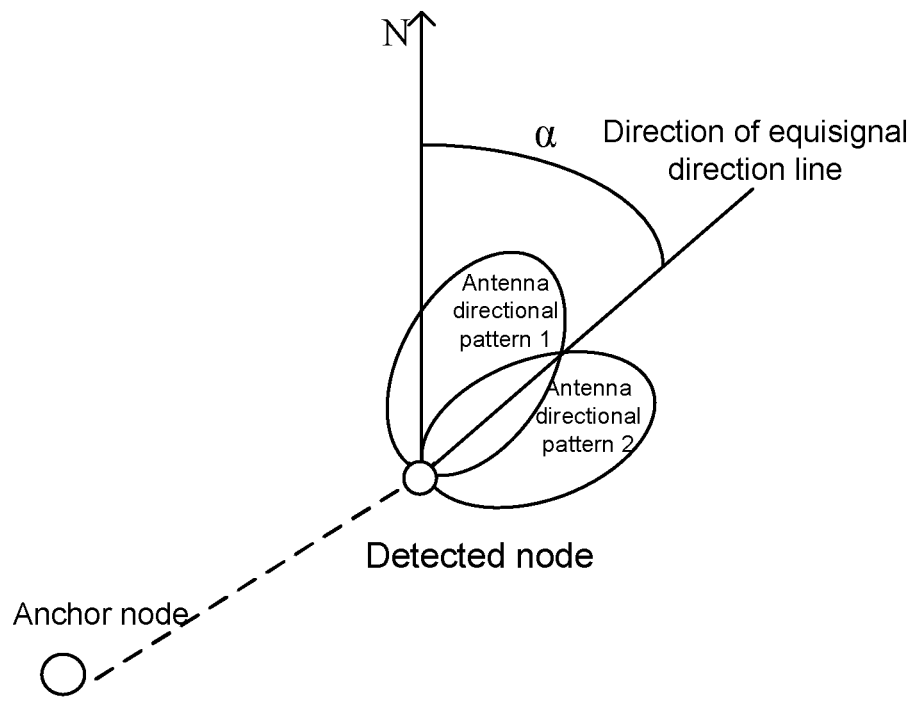
FIG. 10 is a schematic diagram illustrating that an equi-signal line and an anchor node are not in the same quadrant according to a preferred embodiment of the present invention.

The method for estimating an angle is effective when an equisignal direction line of the two antennae is in the same quadrant as an anchor node. However, the method for estimating an angle is ineffective when the equisignal direction line of the two antennae is not in the same quadrant as the anchor node (as shown in FIG. 10). Therefore, the case that the equisignal direction line and the anchor node appear in different quadrants is avoided when an angle is located in the design of the embodiment.

Figure 11:
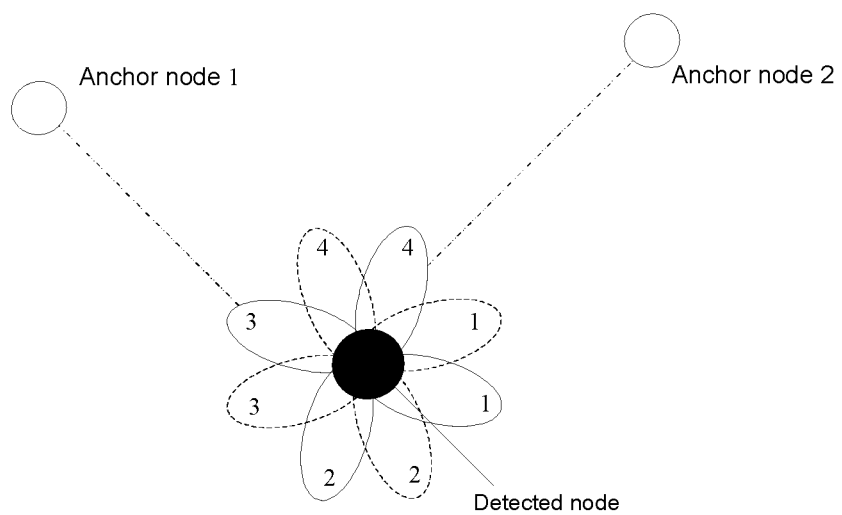
FIG. 11 is a schematic diagram of directional antennae correspondingly to four rotations of a detected node according to a preferred embodiment of the present invention.

As shown in FIG. 11, a terminal with double antennae may be placed in directions 1, 2, 3 and 4 at different times as shown in the figure, with an angle of 90 degrees between the directions. That is, the terminal may rotate by 90 degrees to achieve the condition as shown in the figure. A value (4*2, 8 values totally) of the strength of a signal received by an anchor node correspondingly at each location and each moment is recorded, and a relative angle acquired each time is calculated, thereby acquiring 4 relative angles. A corresponding relative angle acquired at the largest value of signal strength is selected after the final calculation, corresponding to the case that an equisignal direction is in the same quadrant as the detected node. The value at the moment is used as a correct value of a relative angle.

Figure 12:
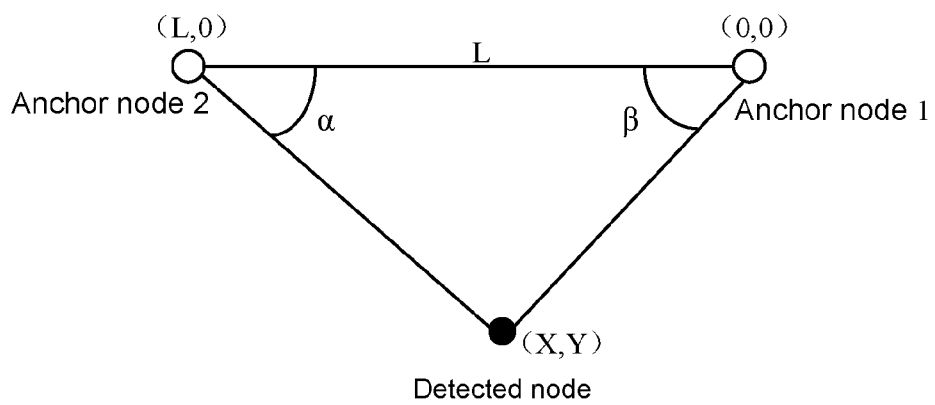
FIG. 12 is a schematic diagram illustrating principles of triangle locating according to a preferred embodiment of the present invention.

After relations of the relative angles between the plurality of anchor nodes and the detected node are acquired, a location of the detected node is determined according to the principle of trigonometry, and the principle is as shown in FIG. 12.

The content of the embodiment is design of a transmission node including double directional antennae. It may be learned from FIG. 12 that one detected node may be located by at least two anchor nodes while the detected node may fail to meet a distance measurement condition of the anchor nodes. Therefore, the detected node needs to rotate by 90 degrees for 4 times automatically after an anchor node is located initially, thereby ensuring that a value of a relative angle between the detected node and the anchor node can be calculated correctly.

A process of locating the detected node will be described as follows.

The WIFI anchor node is opened, and an anchor node works simultaneously. The detected node is placed at a location with a signal of the anchor node. At the moment, the detected node selects a channel of a directional antenna through the radio frequency switch to perform transmission. Anchor node 1 detects an RSS 11A and anchor node 2 detects an RSS 21A. After it is determined that detection of the received strength has been completed, the detected node opens a channel of the other directional switch via the ratio frequency switch to perform transmission. Anchor node 1 detects an RSS 11B and anchor node 2 detects an RSS 21B. Anchor node 1 and anchor node 2 send the detected data to a system side. The system side calculates, according to the signal strength, a relative angle α1 between anchor node 1 and the detected node, and a relative angle β1 between anchor node 2 and the detected node.

After rotating by 90 degrees, the detected node further detects the signal strength 12A of anchor node 1, and the signal strength 22A of anchor node 2, changes a channel of a directional antenna to detect the signal strength 12B of anchor node 1 and the signal strength 22B of anchor node 2, and finally acquires relative angles α2 and β2.

The detected node further rotates by 90 degrees twice to acquire α3, β3, α4 and β4 finally, i.e. information of four groups of relative angles. To identify relative locations of anchor node 1 and the detected node, it is assumed that the signal strength 12A detected by the anchor node is the largest signal strength, then the relative angle α2 acquired correspondingly is a relative angle between anchor node 1 and the detected node. A true relative angle between anchor node 2 and the detected node may be acquired similarly. Specific location information of the detected node may be determined according these two relative angles and location information determined by the anchor nodes.

It may be learned from the foregoing description that the present invention implements the following technical effect.

The method simplifies a WLAN locating method, and is able to complete locating by only modifying an existing terminal slightly, and adding a directional antenna. The method with a small amount of calculation and little modification to an existing system is simple with extremely high precision compared with an existing WIFI locating algorithm.

Obviously, those skilled in the art should understand that the modules or steps of the present invention may be implemented by general computing devices and centralized in a single computing device or distributed on a network consisting of multiple computing devices. Optionally, the modules or steps may be implemented by program codes executable by the computing devices, so that they may be stored in a storage device and executed by the computing devices, and in some cases, the steps as illustrated or described may be implemented according to sequences different from those described herein, or they may be implemented by respectively fabricating them into integrated circuit modules or by fabricating multiple modules or steps in the modules or steps into a single integrated circuit module. By doing so, the present invention is not limited to any specific combination of hardware and software.

The above are only preferred embodiments of the present invention and should not be used for limiting the present invention. For those skilled in the art, the present invention may have various modifications and changes. Any modifications, equivalent replacements, improvements and the like made within the spirit and principle of the present invention shall fall within the scope of protection of the present invention.

What is claimed is:

1. A mobile terminal, comprising:
    a first antenna, configured to transmit a first signal to an anchor node, wherein the first signal is used by the anchor node to detect the signal strength of the first antenna;
    a second antenna, arranged with the first antenna at a preset angle and configured to transmit a second signal to the anchor node, wherein the second signal is used by the anchor node to detect the signal strength of the second antenna, there is an overlap between the coverage of the first antenna and that of the second antenna due to the preset angle, and the signal strength of the first antenna and the signal strength of the second antenna are used for determining the location of the mobile terminal.

2. The mobile terminal according to claim 1, wherein the mobile terminal further comprises:
    a radio frequency switch, connected with the first antenna and the second antenna, and configured to control the first antenna and the second antenna not in an open state or a closed state simultaneously.

3. A method for determining an angle between a mobile terminal and an anchor node, comprising:
    determining the strength of a first signal transmitted by a first antenna of the mobile terminal;
    determining the strength of a second signal transmitted by a second antenna of the mobile terminal, wherein the second antenna is arranged with the first antenna at a preset angle, and there is an overlap between the coverage of the first antenna and that of the second antenna due to the preset angle;
    determining a relative angle between the mobile terminal and the anchor node according to a linear relation of a ratio of the strength of the first signal to the strength of the second signal.

4. The method according to claim 3, wherein a calculation formula for determining the relative angle φ between the mobile terminal and the anchor node according to the linear relation of the ratio of the strength of the first signal to the strength of the second signal is as follows:

$$\varphi = \frac{RSSI_A}{RSSI_B} k,$$

where $RSSI_A$ is the strength of the first signal received from the first antenna, $RSSI_B$ is the strength of the second signal received from the second antenna, and k is a natural number.

5. A locating method, comprising:
    determining, according to the strength of a first signal received by a plurality of anchor nodes and transmitted by a first antenna of a mobile terminal, and the strength of a second signal transmitted by a second antenna of the mobile terminal, a plurality of relative angles between the mobile terminal and the plurality of anchor nodes, wherein the second antenna and the first antenna are arranged at a preset angle, and there is an overlap between the coverage of the first antenna and that of the second antenna due to the preset angle;
determining the location of the mobile terminal according to the plurality of relative angles with the plurality of anchor nodes.

6. The method according to claim 5, wherein when there are two anchor nodes, the method comprises:
determining, according to the strength of the first signal transmitted by the first antenna and the strength of the second signal transmitted by the second antenna, a plurality of relative angles between the mobile terminal and the two anchor nodes;
determining the location of the mobile terminal according to the plurality of relative angles with the two anchor nodes.

7. The method according to claim 6, wherein the step of determining the plurality of relative angles between the mobile terminal and the two anchor nodes according to the strength of the first signal transmitted by the first antenna and the strength of the second signal transmitted by the second antenna comprises:
determining, according to the strength of the first signal transmitted by the first antenna and the strength of the second signal transmitted by the second antenna, a first group of relative angles between the mobile terminal and the two anchor nodes, wherein the relative angles comprise: a first relative angle between the mobile terminal and a first anchor node, and a second relative angle between the mobile terminal and a second anchor node;
determining, according to the signal strength of an antenna group consisting of the first antenna and the second antenna after each rotation of the mobile terminal, a second group of relative angles, a third group of relative angles and a fourth group of relative angles, wherein the mobile terminal is rotated for three times, and is rotated by 90 degrees each time.

8. The method according to claim 6, wherein the relative angles are in a linear relation with ratio of the strength of first signal received from the first antenna to the strength of the second signal received from the second antenna.

9. The method according to claim 7, wherein the step of determining, according to the strength of the first signal transmitted by the first antenna and the strength of the second signal transmitted by the second antenna, the first group of relative angles between the mobile terminal and the two anchor nodes comprises:
determining, according to the strength of the first signal transmitted by the first antenna and the strength of the second signal transmitted by the second antenna, a first group of first relative angles between the first anchor node and the mobile terminal;
determining, according to the strength of the first signal transmitted by the first antenna and the strength of the second signal transmitted by the second antenna, a first group of second relative angles between the second anchor node and the mobile terminal.

10. The method according to claim 7, wherein the relative angles are in a linear relation with ratio of the strength of first signal received from the first antenna to the strength of the second signal received from the second antenna.

11. The method according to claim 9, wherein after determining, according to the strength of the first signal transmitted by the first antenna and the strength of the second signal transmitted by the second antenna, the first group of second relative angles between the second anchor node and the mobile terminal, the method further comprises:
determining the location of the mobile terminal according to the first relative angles and the second relative angles.

12. The method according to claim 9, wherein the operation of determining the location of the mobile terminal according to the plurality of relative angles with the two anchor nodes comprises:
respectively selecting two relative angles with the strongest strength of the first signal or the second signal received by the two anchor nodes;
determining the location of the mobile terminal according to the two relative angles.

13. The method according to claim 5, wherein the relative angles are in a linear relation with ratio of the strength of first signal received from the first antenna to the strength of the second signal received from the second antenna.

14. The method according to claim 13, wherein a calculation formula of the relative angles $\phi$ is as follows:

$$\varphi = \frac{RSSI_A}{RSSI_B} k,$$

where $RSSI_A$ is the strength of the first signal received from the first antenna, $RSSI_B$ is the strength of the second signal received from the second antenna, and k is a natural number.

15. A locating device, comprising:
a first determining module, configured to determine, according to the strength of a first signal received by a plurality of anchor nodes and transmitted by a first antenna of a mobile terminal, and the strength of a second signal transmitted by a second antenna, a plurality of relative angles between the mobile terminal and the plurality of anchor nodes, wherein there is an overlap between the coverage of the first antenna and that of the second antenna;
a second determining module, configured to determine a location of the mobile terminal according to the plurality of relative angles with the plurality of anchor nodes.

16. The device according to claim 15, wherein
the first determining module is further configured to determine, according to the strength of the first signal transmitted by the first antenna and the strength of the second signal transmitted by the second antenna, a plurality of relative angles between the mobile terminal and two anchor nodes;
the second determining module is further configured to determine the location of the mobile terminal according to the plurality of relative angles with the two anchor nodes.

17. The device according to claim 16, wherein the first determining module comprises:
a determining unit, configured to determine, according to the strength of the first signal transmitted by the first antenna and the strength of the second signal transmitted by the second antenna, a first group of relative angles between the mobile terminal and the two anchor nodes, wherein the relative angles comprise: a first relative angle between the mobile terminal and a first anchor node, and a second relative angle between the mobile terminal and a second anchor node;
the determining unit is further configured to determine, according to the signal strength of an antenna group consisting of the first antenna and the second antenna after each rotation of the mobile terminal, a second group of relative angles, a third group of relative angles and a fourth group of relative angles, wherein the mobile terminal is rotated for three times, and is rotated by 90 degrees each time.

18. The device according to claim 17, wherein the determining unit comprises:
   a first determining sub-unit, configured to determine, according to the strength of the first signal transmitted by the first antenna and the strength of the second signal transmitted by the second antenna, a first group of first relative angles between the first anchor node and the mobile terminal;
   a second determining sub-unit, configured to determine, according to the strength of the first signal transmitted by the first antenna and the strength of the second signal transmitted by the second antenna, a first group of second relative angles between the second anchor node and the mobile terminal.

19. A device for determining an angle between a mobile device and an anchor node, comprising:
   a third determining module, configured to determine the strength of a first signal transmitted by a first antenna of the mobile terminal;
   a fourth determining module, configured to determine the strength of a second signal transmitted by a second antenna of the mobile terminal, wherein there is an overlapped between the coverage of the second antenna and that of the first antenna;
   a fifth determining module, configured to determine, according to a linear relation of a ratio of the strength of the first signal to the strength of the second signal, a relative angle between the mobile terminal and the anchor node.

20. The device according to claim 19, wherein the fifth determining module determines the relative angle φ according to the following formula:

$$\varphi = \frac{RSSI_A}{RSSI_B} k,$$

where $RSSI_A$ is the strength of the first signal received from the first antenna, $RSSI_B$ is the strength of the second signal received from the second antenna, and k is a natural number.

* * * * *